United States Patent [19]
Gall

[11] Patent Number: 5,533,239
[45] Date of Patent: Jul. 9, 1996

[54] ADJUSTABLE COMPOUND CABLE BEAM PROFILE CLIP

[76] Inventor: Allen M. Gall, 14926 Tokay Colony Rd., Lodi, Calif. 95240

[21] Appl. No.: 363,947

[22] Filed: Dec. 27, 1994

[51] Int. Cl.⁶ ................................................. E04C 5/16
[52] U.S. Cl. .......................... 24/339; 24/129 B; 24/563; 52/686
[58] Field of Search .................................. 403/314, 300, 403/232.1, 233; 52/686, 685; 24/563, 339, 129 B, 573.1, 30.55

[56] References Cited

U.S. PATENT DOCUMENTS

| | | | |
|---|---|---|---|
| 977,704 | 12/1910 | Brownlee | 52/686 |
| 1,063,663 | 6/1913 | Davis | 52/686 |
| 2,216,886 | 10/1940 | Langelier | 24/536 X |
| 3,004,370 | 10/1961 | Tinnerman | 52/686 X |
| 3,295,812 | 1/1967 | Schneider et al. | 24/339 X |
| 4,309,120 | 1/1982 | Werthmann | 24/339 X |
| 5,231,735 | 8/1993 | Paxton | 24/30.55 |
| 5,311,646 | 5/1994 | Eischen, Sr. | 24/30.55 |

FOREIGN PATENT DOCUMENTS 404154  6/1966  Switzerland ............................. 52/686

*Primary Examiner*—James R. Brittain
*Attorney, Agent, or Firm*—Mark C. Jacobs

[57] ABSTRACT

A sheet metal spring clip made from a resilient metal rectangular strip which is bent at various locations intermediate its top and bottom edges to cause sections of the clip to lie one above the other in a spaced relationship. The clip has a pair of connected elongated apertures each having unbroken walls normal to flat top and bottom surfaces, which walls serve as bearing surfaces at opposite sides of each of the two connected apertures for mounting of the clip preferably on a vertical support. Spaced handles similarly directed permit the resilient clip to be squeezed for positional alignment on the support. The clip further includes an edge slot in communication with a third elongated aperture, which aperture has similar walls and serves to provide bearing surfaces for retention of a bar normally disposed with respect to the support, after the clip has been positioned at a desired elevation.

16 Claims, 2 Drawing Sheets

ADJUSTABLE COMPOUND CABLE BEAM PROFILE CLIP

FIELD OF THE INVENTION

BACKGROUND OF THE INVENTION

In the construction of large buildings, a technique that is commonly employed is to use a cable beam for strength and reinforcement of the concrete used at the various deck levels. Means are employed for reinforcing bars or rods which are to be arranged in a crossed relationship. While jigs and clips have been previously patented, as one who is active in the trade, applicant has found that in general craftsmen use wire to bind the rebar cross members or carrying bars in place onto the large U-shape members commonly used in the industry today which are also made of rebar and which are called stirrups. Such a procedure is tedious and if a mistake is made in setting an elevation, the old cable tie must be undone, the elevation change made for the crossmember, which is also called a carrying bar for it carries the cables, followed by a retying of a new cable tie. It was believed that a clip that was easily adjustable would be a labor saving device for the iron workers who out this task. Accordingly the clip of this invention was designed.

Then, a patent novelty search was conducted on behalf of applicant and the following patents turned up during the course of the search:

| | |
|---|---|
| 839,149 | Jackson |
| 871,210 | Cummings |
| 977,704 | Brownlee |
| 1,063,663 | Davis |
| 1,120,374 | Craven |
| 1,505,220 | Shay |
| 2,295,685 | Place |
| 2,961,479 | Bertling |
| 3,437,298 | Seckerson |
| 4,309,120 | Werthmann |

None of the references individually or collectively anticipate or render obvious the device of this invention.

It is a first object to provide a novel cable beam profile clip.

Another object is to provide a novel connector for use with stirrups in the construction of a cable deck for tall buildings.

Still another object is to provide a device for setting the profile bar at the desired and proper elevation on the stirrup.

A further object is to provide a device that permits a change in the elevation of a profile bar being retained by the device relative to the elevation of the stirrup arm to be made at any point in time as may be needed prior to the disposition of the stirrup with its cables in a sea of concrete.

Yet another object is to provide a flexible cable beam profile clip that is readily adjustable when attached to a stirrup arm.

A yet further object is to provide a clip from a single sheet of resilient metal by bending the metal into a freeform C-like structure with a pair of slots so positioned that a stirrup arm may be brought into a firm gripping engagement with, or disengaged from said clip by manipulation of the clip at the will of the person applying or removing the clip, and which clip permits the receipt of a profile arm normal to the disposition of the stirrup.

Other objects of the invention will in part be obvious and will in part appear hereinafter.

The invention accordingly comprises the device possessing the features properties and the relation of components which are exemplified in the following detailed disclosure and the scope of the application of which will be indicated in the appended claims.

For a fuller understanding of the nature and objects of the invention reference should be made to the following detailed description, taken in conjunction with the accompanying drawings.

SUMMARY OF THE INVENTION

Figure 1:
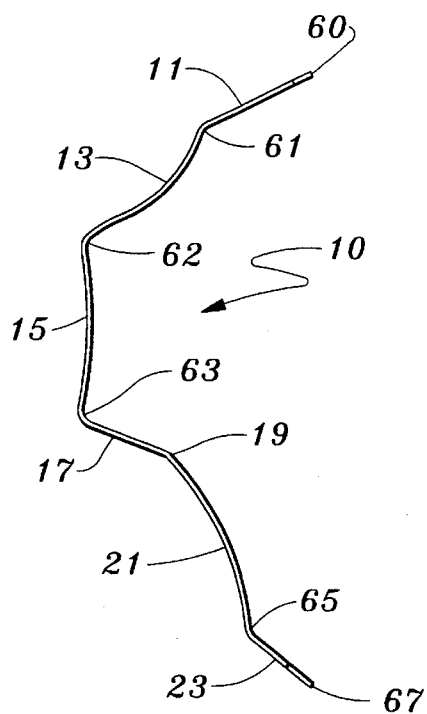
FIG. 1 is a left side elevational view of the device of this invention.

A sheet metal spring clip made of resilient metal bent at various locations intermediate its top and bottom edges to cause sections of the clip to lie one above the other in a spaced relationship. The clip has a pair of slot-connected elongated apertures each aperture having unbroken walls normal to flat top and bottom surfaces, which walls serve as bearing surfaces at opposite sides of each of the two connected apertures for mounting preferably on a vertical support. The clip further includes an edge slot in communication with a third elongated aperture, which third aperture has similar walls and serves to provide bearing surfaces for retention of a bar normally disposed with respect to the support.

DESCRIPTION OF THE PREFERRED EMBODIMENT

In the construction of tall buildings it is customary to utilize what is designated in the art as a cable deck to provide strength and reinforcement. In the manufacture of these cable beams one utilizes a series of what are called stirrups. These stirrups are linearly aligned and set apart at anywhere from between 12" and 24" on center. These stirrups are generally U-shaped members formed of bent rebar of a convenient size, suitable according to the local building code. Such a stirrup is designated 50 in FIG. 5. Disposed across each stirrup is a profile bar, 51 per FIG. 5. These profile bars are set at different elevations from stirrup to stirrup in the cable beam, with the high point of the profile bar being at a vertical column. The low point positioning of a profile bar is at the middle between any two columns, due to the fact that cables tend to sag due to gravity.

It is well known that cables are tied to the profile bar with conventional cable ties. My invention makes no change in such conventional procedure. Rather my invention is utilized in setting the profile bar at the desired and proper elevation on the stirrup.

The sheet metal clip of the present invention as illustrated here is constructed from an elongated strip of sheet metal, preferably of a chamfered rectangle configuration which is tempered to provide it with the desired resilience. Tempering is preferably carried out after the needed cutouts have been made and the necessary bends added to achieve the desired shape.

The reader is directed now to FIGS. 1–4. The clip is shown on edge or in a side view in FIGS. 1 and 3, and in front and rear views in FIGS. 2 and 4. After the proper bends have been made following the provision of the various cutouts in the sheet stock, clip 10, per FIG. 1, takes on an opened C-like profile configuration.

Device 10 starts out as a generally rectangular sheet of metal having a flat upper surface 10U and a flat lower surface 10L. The orientation of the device 10 is indicated in the width as 10W and in the length or height as 10H. Spaced handle sections 11 and 23 are mirror image, preferably chamfered corner uninterrupted sheet metal segments at opposite ends of the length of the device. The chamfers 12 at the corners of the device are intended to reduce the chances of finger cuts during utilization of the handles.

The term overlying is used to signify sections of the clip that lay over or overlie either the support upon which the device is disposed, or which overlies a cross member disposed therein. Immediately adjacent and of equal lateral extension to handle 11 is first overlying section 13. At the opposite end of the device immediately adjacent and of equal horizontal extension is third overlying section 21.

A second overlying section 15 abuts the first overlying section. Second overlying section 17 terminates at its lower end along fold 63, which also serves as the commencement of intermediate panel 17. Intermediate panel 17 extends generally downwardly and terminates at crease 19, which crease also serves as the upper edge of third overlying section 21.

The location of the crease line 19 to be discussed in detail below, is noted at below the midpoint of height 10H of the device 10. This determination helps one to position the profile bar cutout 14 and the stirrup cutout 22 correctly as will also be discussed.

Device 10 also includes a pair of connected elongated spaced apertures designated 26 and 26' which form part of the stirrup mount 20, and a third elongated aperture 16 which forms part of the profile bar cutout. The discussion now moves to this element.

The profile bar cutout 14 consists of an inwardly directed edge slot 18 which commences at the right edge along the elevation 10H of the device. This slot with a finite height terminates in a heightened and lowered enlarged area, i.e., a third elongated aperture 16, also designated the profile bar receiving neck 16. The profile bar cutout 14, considered as a whole resembles a keyhole turned on its side.

The stirrup mount 20 so called because it is the portion of the device utilized for the mounting or disposition upon a stirrup, comprises an overlying elongated stirrup slot, 22 which is directed downwardly left of the vertical center axis of the device. This slot 22 communicates with a pair of vertically spaced generally rectangular entry zones 24 and 24'. The upper edge, 24U of the upper entry zone 24 and the lower edge 24'L of the lower entry zone 24' are coextensive with the upper edge and the lower edge of the stirrup slot 22's elevation respectively. Each entry zone 24, 24' also communicates with an enlarged somewhat oval-like stirrup holding elongated aperture, 26, 26' such that the combination of each entry zone with its respective stirrup holding aperture also simulates a keyhole.

In view of the combined configuration of each respective entry zone and its associated elongated aperture taken in conjunction with the spacing therebetween, it is seen that a tipped over T-shaped metal portion 28 as noted above having a shoulder 28S and a leg 28L is in fact disposed between the two keyholes referred to just above. T-shaped portion 28 is seen to lie partly in section 13 and partly in section 15 in accordance with FIGS. 1 and 3.

As noted earlier each of the four corners 12 of device 10 may be chamfered to avoid finger cuts.

Having thus described the cutouts in the sheet metal, the bends which are made shall now be described. Thus it is seen that the device 10 includes a pair of mirror image handle sections, 11 and 23 both of which are disposed laterally in the same general direction, rightwardly in FIG. 1. Upper handle 11 is disposed at about 45° up from the horizontal while lower handle 23 is disposed at about 45° down from the horizontal. Disposed immediately below and connected to handle 11, is first overlying section 13. While immediately above and connected to handle 23, along fold 65, is third overlying section 21. Overlying section 13 is configured as an arc segment of about 20° between folds 61 and 62. See FIG. 1 where the unit's top edge is designated 60 and the bottom edge 67 is also shown.

The third overlying section, as indicated at designator 21, is also arcuate in configuration and is of about 20° running from fold 65 at the lower end to crease 19 at its upper end. Intermediate panel 17 is leftwardly and upwardly disposed at about a 45° angle from crease 19.

Connecting the intermediate panel 17 and the first overlying section 13 is the second overlying section 15. This is also an arcuate section of about 20° facing rightwardly, and disposed between fold lines 62 and 63.

The difference between a fold such as at point 62 or 65 etcetera, and the crease 19, is that the folds are gentle and rolling while crease 19 is a hard angle bend that is sharply delineated.

The term overlying section is employed because this is the section which receives a member, either a stirrup arm or the profile bar as will be described infra.

Figure 2:
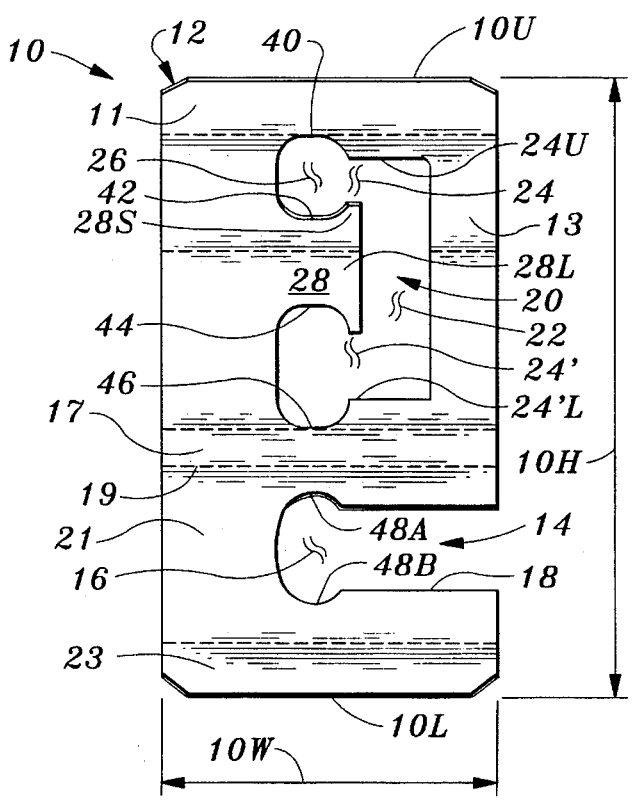
FIG. 2 is a front elevational thereof.
Figure 3:
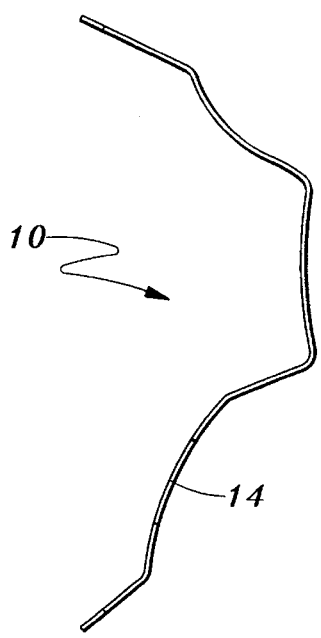
FIG. 3 is a right side elevational view of the device of this invention.
Figure 4:
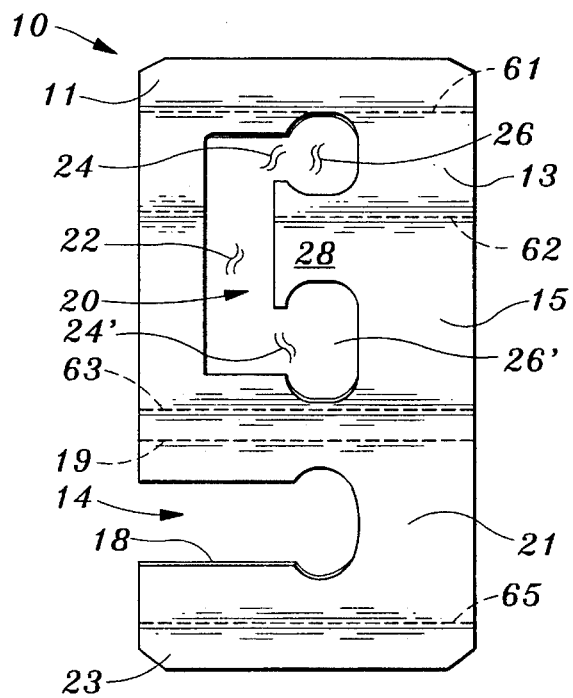
FIG. 4 is a rear elevational view thereof, view showing the utilization of the device of this invention.

When viewing device 10 from the edge as in FIG. 1 or FIG. 3, it is difficult for the reader to note the relative positioning of the slots and apertures discussed with respect to FIGS. 2 and 4. Thus it should be noted that from a relative disposition point of view the lower stirrup holding section 26 has its lower edge at fold 63.

As to materials, I can use metal such as annealed iron sheet stock that varies in thickness from between 20/1000ths inch thick to 40/1000ths inch thick with a preferred thickness of 25/1000ths.

UTILIZATION

Figure 5:
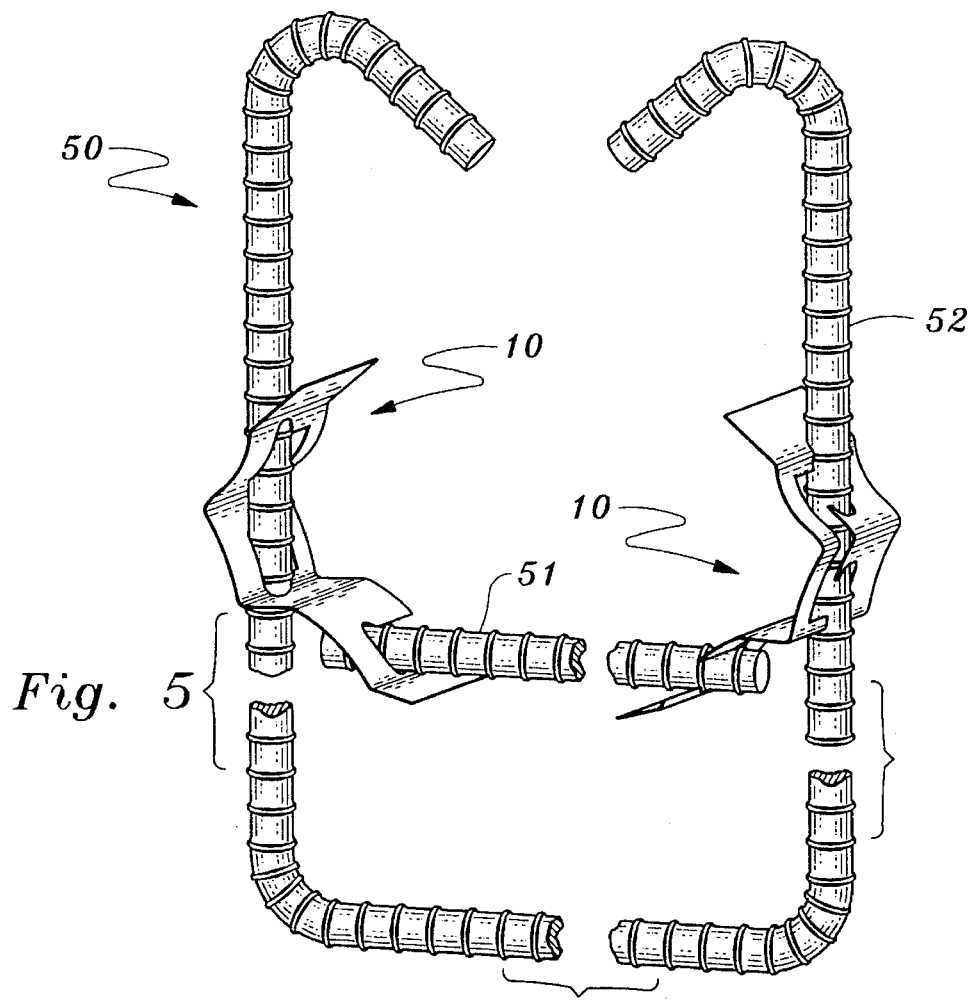
FIG. 5 is a close-up elevational view showing the use of this device.
Figure 6:
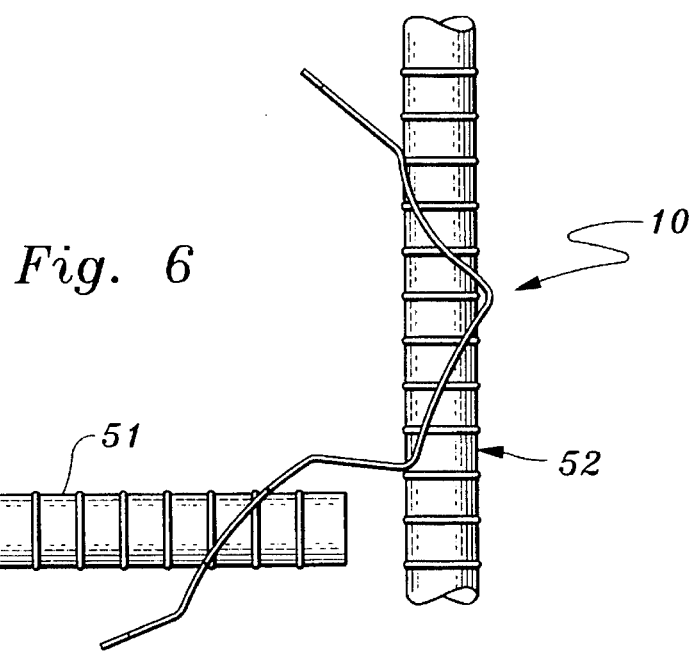

Reference is made to FIG. 5 which depicts a stirrup 50, which is formed of bent rebar steel of anywhere from ⅜ to about ¾-inch steel bar stock and two clips 10 according to this invention. The clips 10 are each disposed at a predetermined desired elevation on the stirrup 50. A profile bar 51 is seen to be set into the pair of clips 10. FIG. 6 is a close-up view of one arm 52 of the stirrup 50 with a clip 10 positioned in place on the stirrup and holding the profile bar.

In order to get the clip to assume the position noted just above, involves several steps. The first step is to place the clip 10, over the first arm 52, of the stirrup and slide it on, then squeeze it down by the handle sections, 11 and 23 to apply tension, i.e., bring the two handles 11 and 23 toward each other, such that the stirrup arm 52 slides into the stirrup mount's stirrup slot, through the two entry zones 24 and then into the two receiving sections, i.e., apertures 26 and 26' adjacent the stirrup slot. Tension is then relieved by letting go of the two handles 11 and 23. This procedure is repeated for the second arm 52, of the stirrup with a second such device. When positioned correctly the stirrup arm will press against or bear against the rear edge of pressure point 40, the front edge of pressure point 42, the front edge of pressure point 44, and the rear edge of pressure point 46. This is true for both the left and right clips 10 of FIG. 5. When so positioned, the pressure will retain the clip 10 in a firm disposition when one removes pressure from the handles.

A profile bar 51, is cut to be slightly smaller than the inside diameter between the two stirrup arms. The profile bar 51, is placed into the keyway 18 of the profile bar's cutout 14, and moved into position into the profile neck 16. Next, put the profile bar's opposite end into the second clip's profile slot's keyway, and snap the bar into place into the second clip's profile neck 18, to lock it in place at a generally right angle to the stirrup. When properly disposed, the profile bar 51 bears against the rear edge of the pressure point 48A and the inside edge of pressure point 48B.

The cables can then be attached in the conventional manner.

Since certain changes may be made in the above described apparatus without departing from the scope of the invention herein involved, it is intended that all matter contained in the above description and shown in the accompanying drawings shall be interpreted as illustrative and not in a limiting sense.

I claim:

1. An apertured clip for disposition upon a rebar stirrup for the receipt of a profile bar which clip comprises a resilient metal elongated strip having a top edge and a bottom edge, which strip is bent at various locations intermediate its ends to cause sections of the clip to lie one above the other in a spaced relationship, said apertures comprising:

a pair of connected elongated apertures each having unbroken walls normal to flat top and bottom surfaces, which walls serve as bearing surfaces at opposite sides of each of the two connected apertures for mounting of the clip on a support;

an edge slot in communication with a third elongated aperture, said third aperture has similar walls and serves to provide bearing surfaces for retention of a bar normally disposed with respect to a support.

2. An apertured clip for disposition upon a rebar stirrup for the receipt of a profile bar which clip comprises a resilient metal generally rectangular strip having a top edge and a bottom edge, which strip is bent at various locations intermediate its ends to cause sections of the clip to lie one above the other in a spaced relationship, and which clip has a stirrup mount which comprises:

an elongated stirrup slot, directed downwardly in communication with a pair of vertically spaced generally rectangular entry zones; namely, an upper entry zone and a lower entry zone, each of which entry zones communicates with an enlarged generally oval elongated aperture, such that the combination of each entry zone with its respective aperture simulates a keyhole, and which clip also has a third elongated aperture and an edge slot, said third aperture has similar walls and serves to provide bearing surfaces for retention of a bar normally disposed with respect to a support, said third aperture being in communication with said edge slot.

3. In the clip of claim 2 wherein each entry zone has an upper and lower edge and the upper edge, of the upper entry zone and the lower edge of the lower entry zone are coextensive with the upper edge and the lower edge of the stirrup slot's elevation respectively.

4. The clip of claim 2 wherein each generally oval aperture connected to an entry zone has unbroken walls normal to flat top and bottom surfaces.

5. An apertured clip for disposition upon a rebar stirrup for the receipt of a profile bar which clip comprises a resilient metal generally rectangular strip having a top edge and a bottom edge, which strip is bent at various locations intermediate its ends to cause sections of the clip to lie one above the other in a spaced relationship, which clip further comprises an upper and a lower spaced mirror image similarly laterally directed handle sections at opposite ends of the length of the clip, said handle sections including corners, an arc shaped first overlying section immediately adjacent to and of equal lateral extension as, and connected to said upper handle, said first overlying section also being connected by a fold to;

an arcuate second overlying section abutting said first overlying section, which second section terminates along a fold at its lower end, which fold also serves as the upper edge of an intermediate panel, said first overlying section and said second overlying section having means for positively connecting said apertured clip to a rebar stirrup, said intermediate panel being disposed angularly and upwardly from a crease at its lower edge, which connects said intermediate panel to, an arcuate third overlying section disposed adjacent said lower handle section, said third overlying section having an elongated aperture and an edge slot, which aperture is in communication with said edge slot wherein when mounted on a rebar stirrup, the said profile bar is received in the arcuate third overlying section's elongated aperture.

6. The clip of claim 5 wherein the corners are chamfered.

7. The clip of claim 5 wherein the crease between the intermediate panel and third overlying sections is disposed at about the midpoint of the height of said clip.

8. The clip of claim 5 wherein the means for connecting is a stirrup mount comprising an elongated stirrup slot, directed downwardly in communication with a pair of vertically spaced generally rectangular entry zones; namely, an upper, entry zone and a lower entry zone, each of which entry zones communicates with an enlarged, generally oval elongated aperture, such that the combination of each entry zone with its respective aperture simulates a keyhole.

9. The clip of claim 8 wherein the stirrup mount is disposed in the first and second overlying sections.

10. The clip of claim 8 wherein the upper handle section is disposed at about 45° up from the horizontal while the lower handle section is disposed at about 45° down from the horizontal.

11. The clip of claim 8 wherein the first, second, and third overlying sections are each arc segments of about 20°.

12. An apertured clip for disposition upon a rebar stirrup for the receipt of a profile bar which clip comprises a generally rectangular resilient metal strip having a top edge and a bottom edge, which strip is bent at various locations intermediate its ends to cause sections of the clip to lie one above the other in a spaced relationship, which clip further comprises an upper and a lower spaced mirror image similarly laterally directed handle sections at opposite ends of the length of the clip, an arc shaped first overlying section immediately adjacent to and of equal lateral extension as, and connected to said upper handle, said first overlying section also being connected by a fold to;

an arcuate second overlying section abutting said first overlying section, which second section terminates along a fold at its lower end, which fold also serves as the upper edge of an intermediate panel, said intermediate panel being disposed leftwardly and upwardly from a crease at its lower edge, which connects said intermediate panel to, an arcuate third overlying section disposed adjacent said lower handle section, said third overlying section having an elongated aperture and an edge slot, which aperture is in communication with said edge slot, further including a stirrup mount disposed in the first and second overlying sections comprising an elongated stirrup slot, directed downwardly in communication with a pair of vertically spaced generally rectangular entry zones; namely, an upper entry zone and a lower entry zone, each of which entry zones communicates with an enlarged generally oval elongated aperture, such that the combination of each entry zone with its respective aperture simulates a keyhole.

13. The clip of claim 12 wherein the upper handle section is disposed at about 45° up from the horizontal while the lower handle section is disposed at about 45° down from the horizontal.

14. The clip of claim 13 wherein the handle sections have corners and the corners are chamfered.

15. The clip of claim 14 wherein the first, second, and third overlying sections are each arc segments of about 20°.

16. An apertured clip for disposition upon a rebar stirrup for the receipt of a profile bar which clip comprises a resilient metal elongated strip having a top edge and a bottom edge, which strip is bent at various locations intermediate its ends to cause sections of the clip to lie one above the other in a spaced relationship, which clip further comprises an upper and a lower spaced mirror image similarly laterally directed handle sections at opposite ends of the length of the clip, an arc shaped first overlying section immediately adjacent to and of equal lateral extension as, and connected to said upper handle, said first overlying section also being connected by a fold to;

an arcuate second overlying section abutting said first overlying section, which second section terminates along a fold at its lower end, which fold also serves as the upper edge of an intermediate panel, said first overlying section and second overlying section having means for positively connecting said apertured clip to a rebar stirrup, said intermediate panel being disposed angularly and upwardly from a crease at its lower edge, which connects said intermediate panel to, an arcuate third overlying section disposed adjacent said lower handle section, said third overlying section having an elongated aperture and an edge slot, which aperture is in communication with said edge slot.

\* \* \* \* \*